(12) United States Patent
Nishino et al.

(10) Patent No.: US 6,272,094 B1
(45) Date of Patent: Aug. 7, 2001

(54) MAGNETIC OR OPTICAL DISK CARTRIDGE

(75) Inventors: Yukio Nishino, Ikomagun; Yoshikazu Goto, Hirakatashi, both of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/395,008

(22) Filed: Sep. 13, 1999

(30) Foreign Application Priority Data

Sep. 16, 1998 (JP) .................................................. 10-261137

(51) Int. Cl.⁷ ............................. G11B 33/02; G11B 23/03
(52) U.S. Cl. ........................................ 369/77.2; 360/133
(58) Field of Search .................... 369/77.1–77.2, 369/75.1–75.2; 360/133

(56) References Cited

U.S. PATENT DOCUMENTS

| | | | |
|---|---|---|---|
| 5,164,935 | 11/1992 | Shimegi et al. | 369/77.2 |
| 5,577,014 | 11/1996 | Kawamura | 369/77.2 |
| 5,799,009 | 8/1998 | Takahashi et al. | 369/291 |
| 6,002,556 | * 12/1999 | Oishi | 360/133 |
| 6,075,763 | * 6/2000 | Kano et al. | 360/133 |
| 6,104,577 | * 8/2000 | Kato et al. | 360/133 |

FOREIGN PATENT DOCUMENTS

| | | |
|---|---|---|
| 0871176 | 10/1998 | (EP) . |
| 7-220348 | 8/1995 | (JP) . |
| 09231713 | 5/1997 | (JP) . |
| 9-231713 | 9/1997 | (JP) . |
| 11096719 | 4/1999 | (JP) . |
| 11-288572 | 10/1999 | (JP) . |

OTHER PUBLICATIONS

European Search Report, Application No. EP 99 11 7780.0–2210, dated Feb. 10, 2000.
European Search Report dated Feb. 10, 2000 regarding Patent No. 99117780.9–2210.
Japanese Office Action for application No. 2000–024530.
Japanese Office Action for application No. 11–250647.

* cited by examiner

Primary Examiner—Allen T. Cao
(74) Attorney, Agent, or Firm—Renner, Otto, Boisselle, Sklar

(57) ABSTRACT

The present invention provides a cartridge accommodating a disk therein which is inserted into a cartridge holder, the cartridge holder being provided with a mis-insertion protection member. The mis-insertion protection member is located within an insertion path along which the cartridge is inserted into the cartridge holder. The cartridge has a substantially rectangular shape. The cartridge has a corner portion at each of four corners of the substantially rectangular shape, the corner portion being shaped so as to abut on the mis-insertion protection member to move the mis-insertion protection member out of the insertion path. The cartridge has at least two mis-insertion protection mechanisms for engaging with the mis-insertion protection member so as to prevent the cartridge from being mis-inserted. The cartridge has two side surfaces which are substantially perpendicular to a surface of the disk aid extend along a direction substantially parallel to a direction in which the cartridge is inserted into the cartridge holder. A mis-insertion protection mechanism of the at least two mis-insertion protection mechanisms is provided on each of the side surfaces.

18 Claims, 18 Drawing Sheets

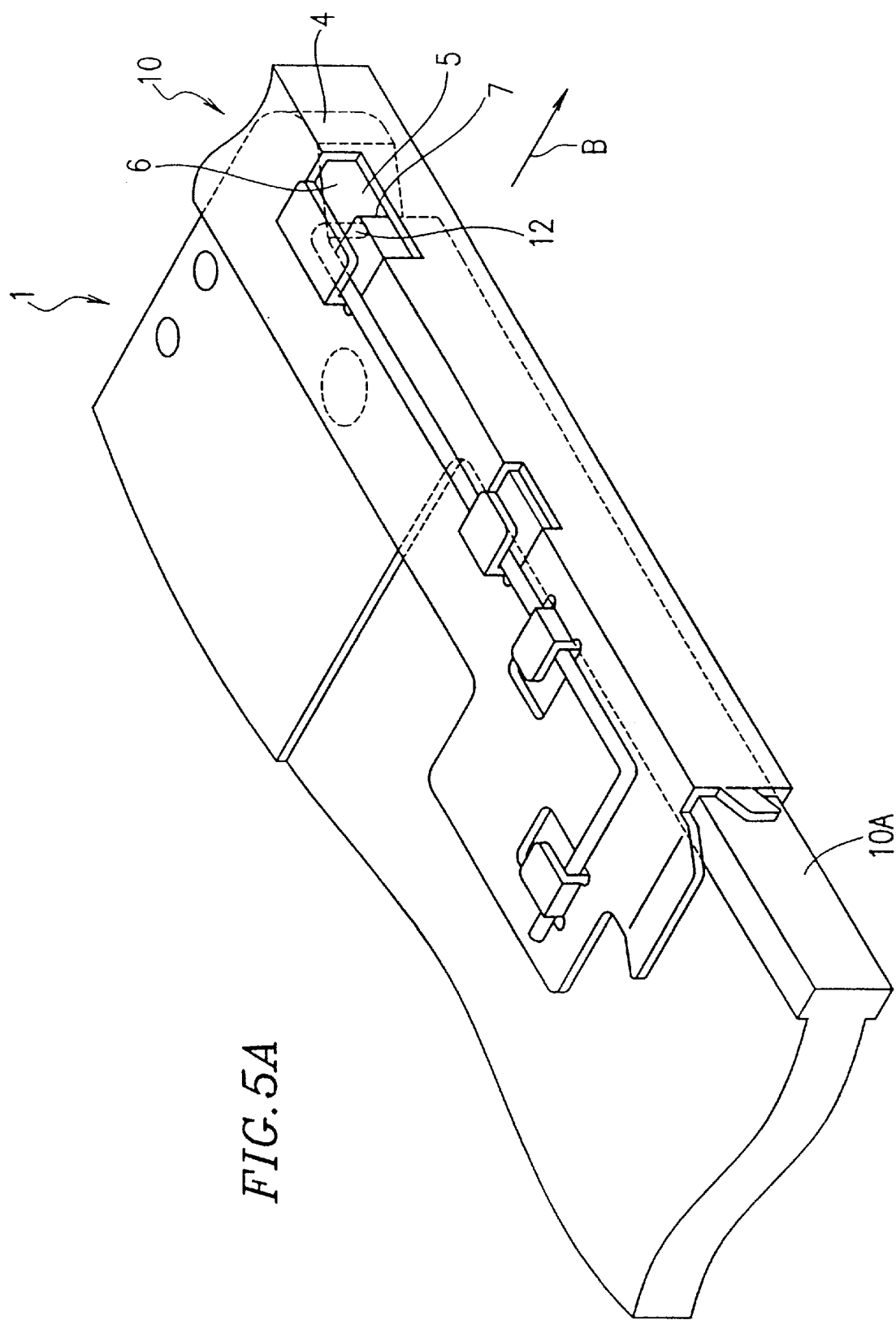

MAGNETIC OR OPTICAL DISK CARTRIDGE

BACKGROUND OF THE INVENTION

1. Field of the Invention

The present invention relates to a mis-insertion protection mechanism in a magnetic or optical disk cartridge for preventing the cartridge from being inserted into a disk drive in a wrong direction.

2. Description of the Related Art

A magnetic or optical disk cartridge is generally in a rectangular shape and has a window opened for receiving an optical pickup and a shutter for opening/closing the window. There are two types of such cartridges: a single-sided cartridge (for use with a single-sided disk) and a double-sided cartridge (for use with a double-sided disk). A single-sided cartridge can be inserted into a disk drive only in one direction. A double-sided cartridge can be inserted into a disk drive in either one of two directions (i.e., it can be inserted with either one of the front side and the reverse side facing up). When a cartridge is inserted in a direction other than the right direction(s), a mis-insertion protection mechanism in the cartridge hits a stopper provided in the disk drive so that the cartridge cannot be inserted any further.

A conventional single-sided cartridge has a mis-insertion protection mechanism provided by differently shaping one of the four corners from the other corners. For example, as shown in FIG. 12, a 3.5" floppy disk cartridge 101 includes a corner 102 on the front edge thereof, which is chamfered. The other three corners 103, 104 and 105 of the cartridge 101 are rounded for easy insertion and easy handling of the cartridge 101, as well as for an aesthetic design.

FIG. 13 illustrates an exemplary cartridge holder 106 for use in a disk drive receiving the cartridge 101. The cartridge holder 106 is provided with a mis-insertion protection pin 107 made of a torsion spring. One end of the mis-insertion protection pin 107 is bent at about 90°, thereby forming a stopper 108, and the other end 107A is secured on an outer surface of the cartridge holder 106.

The stopper 108 extends through a guide hole 109 of the cartridge holder 106 to be within the insertion path of the cartridge 101 (i.e., a path along which the cartridge 101 is inserted). The stopper 108 abuts a tab portion 110 of the cartridge holder 106 and is urged away from a side 111 thereof by virtue of the bias of the torsion spring.

Referring to FIGS. 14, 15 and 16, a mis-insertion protection function provided when the cartridge 101 is inserted into the cartridge holder 106 will be described. First, a case where the cartridge 101 is inserted correctly (in the right direction) will be described. As the cartridge 101 is inserted into the cartridge holder 106 in the right direction as illustrated in FIG. 14, the chamfered corner 102 hits the stopper 108.

Since the corner 102 is chamfered, the insertion of the cartridge 101 forces the stopper 108 out of the insertion path of the cartridge 101 by overcoming the bias of the torsion spring (in the direction indicated by arrow A in FIG. 14), thereby resulting in a state as illustrated in FIG. 15. Thus, the cartridge 101 is allowed to be inserted further into the cartridge holder 106.

Next, a case where the cartridge 101 is inserted in a wrong direction will be described referring to FIG. 16. As the cartridge 101 is inserted into the cartridge holder 106 in the wrong direction as illustrated in FIG. 16, the corner 103 hits the stopper 108. Since the corner 103 is not chamfered, the insertion of the cartridge 101 does not force the stopper 108 in the direction indicated by arrow A.

Therefore, the cartridge 101 cannot be inserted further into the cartridge holder 106, thus providing the mis-insertion protection function. The mis-insertion protection function is similarly provided when the cartridge 101 is inserted from the corner 104 (or 105) (FIG. 12).

Japanese Laid-Open Publication No. 57-113466 describes an exemplary mis-insertion protection mechanism for a double-sided cartridge as illustrated in FIG. 17. Both of the insertion-side corners 172A and 172B are chamfered, so that the cartridge exhibits the same profile whether it is faced up or faced down. Thus, the cartridge can be inserted into the cartridge holder whether it is faced up or faced down.

Regarding the optical disk, there are one-sided optical disks (having a recording surface only on one side) and double-sided optical disks (having a recording surface on both sides). Recently, there is a need in the art to accommodate a single-sided disk in a single-sided cartridge and a double-sided disk in a double-sided cartridge, respectively, so that they can be used in the same disk drive. Along with the increase in the recording density of an optical disk, there is also a demand in the art for a cartridge accommodating a small-diameter optical disk.

Since a pickup for optical disks is larger than a magnetic recording pickup, an optical disk cartridge has a larger window and also requires a larger area for the motion of the shutter ("shutter motion area"). Therefore, in a cartridge accommodating a small-diameter optical disk, the shutter motion area comes close to the side edges, and thus the corners, of the cartridge.

In such an optical disk cartridge desired in the art, it is difficult to provide a mis-insertion protection mechanism by differentiating the shape of one or two corner(s) from that of the other corners as in the prior art. This is because it is difficult to provide a large enough chamfer at the corner(s) to differentiate the corner(s) from the other rounded corners such that a mis-insertion protection function can be provided.

SUMMARY OF THE INVENTION

According to one aspect of this invention, there is provided a cartridge accommodating a disk therein which is inserted into a cartridge holder, the cartridge holder being provided with a mis-insertion protection member. The mis-insertion protection member is located within an insertion path along which the cartridge is inserted into the cartridge holder. The cartridge has a substantially rectangular shape. The cartridge has a corner portion at each of four corners of the substantially rectangular shape, the corner portion being shaped so as to abut on the mis-insertion protection member to move the mis-insertion protection member out of the insertion path. The cartridge has at least two mis-insertion protection mechanisms for engaging with the mis-insertion protection member so as to prevent the cartridge from being mis-inserted. The cartridge has two side surfaces which are substantially perpendicular to a surface of the disk and extend along a direction substantially parallel to a direction in which the cartridge is inserted into the cartridge holder. A mis-insertion protection mechanism of the at least two mis-insertion protection mechanisms is provided on each of the side surfaces.

In one embodiment of the invention, the mis-insertion protection mechanism includes a slot formed in at least one of the side surfaces.

In one embodiment of the invention, the slot includes: an inclined guide section comprising a surface inclined with respect to the side surfaces for guiding the mis-insertion protection member; and a stopper arranged substantially perpendicular to the side surfaces for contacting the mis-insertion protection member to prevent the cartridge from being mis-inserted.

In one embodiment of the invention, the two side surfaces comprise a first side surface and a second side surface. The corner portions comprise first corner portions along the first side surface and second corner portions along the second side surface. The at least two mis-insertion protection mechanisms comprise a first mis-insertion protection mechanism provided in the first side surface and a second mis-insertion protection mechanism provided in the second side surface. A distance between the first mis-insertion protection mechanism and one of the first corner portions is substantially equal to a distance between the second mis-insertion protection mechanism and a corresponding one of the second corner portions.

In one embodiment of the invention, the cartridge comprises a double-sided cartridge.

In one embodiment of the invention, the cartridge comprises a single-sided cartridge.

In one embodiment of the invention, the two side surfaces comprise a first side surface and a second side surface. The at least two mis-insertion protection mechanisms comprise a first mis-insertion protection mechanism provided in the first side surface, a second mis-insertion protection mechanism provided in the second side surface, and a third mis-insertion protection mechanism provided either in the first side surface or in the second side surface.

In one embodiment of the invention, the corner portions comprise first corner portions along the first side surface and second corner portions along the second side surface. The distance between the first mis-insertion protection mechanism and one of the first corner portions is substantially equal to a distance between the second mis-insertion protection mechanism and a corresponding one of the second corner portions.

In one embodiment of the invention, the distance between the first mis-insertion protection mechanism and the one of the first corner portions is substantially equal to a distance between the third mis-insertion protection mechanism and a corresponding one of the first or second corner portions.

In one embodiment of the invention, the cartridge comprises a single-sided cartridge.

In one embodiment of the invention, the cartridge further comprises a concave-shaped auto-loading slot provided in at least one of the side surfaces. The auto-loading slot is located such that the mis-insertion protection member engages with the third mis-insertion protection mechanism after the mis-insertion protection member passes over the auto-loading slot.

In one embodiment of the invention, the cartridge comprises a single-sided cartridge.

In one embodiment of the invention, the cartridge further comprises an opening and a shutter for opening/closing the opening. The mis-insertion protection mechanism is provided outside of a motion area of the shutter.

In one embodiment of the invention, the shutter is movable toward either side of the opening.

In one embodiment of the invention, the cartridge comprises a double-sided cartridge.

In one embodiment of the invention, the shutter is movable toward only one side of the opening.

In one embodiment of the invention, the cartridge comprises a single-sided cartridge.

According to another aspect of this invention, there is provided an auto-loading device for loading a cartridge of the present invention. The auto-loading device comprises: a cartridge holder for holding the cartridge; and an auto-loading mechanism for loading the cartridge. The cartridge holder includes a mis-insertion protection member for engaging with the mis-insertion protection mechanism so as to prevent the cartridge from being mis-inserted. The auto-loading mechanism includes an engagement protrusion for engaging with the auto-loading slot.

In one embodiment of the invention, the auto-loading mechanism further includes a detector for detecting the cartridge.

In one embodiment of the invention, the auto-loading mechanism further comprises a movable plate coupled with the engagement protrusion. The movable plate starts moving along with the cartridge in response to the detector detecting the cartridge.

Thus, the invention described herein makes possible the advantage of providing a mis-insertion protection mechanism in a magnetic or optical disk cartridge for reliably preventing mis-insertion of the cartridge, which can suitably be used in a cartridge with a large shutter motion area, and which can be used either in a single-sided cartridge or in a double-sided cartridge.

This and other advantages of the present invention will become apparent to those skilled in the art upon reading and understanding the following detailed description with reference to the accompanying figures.

BRIEF DESCRIPTION OF THE DRAWINGS

FIG. 5A is a perspective view illustrating how the double-sided cartridge of Example 1 is inserted into the cartridge holder;

DESCRIPTION OF THE PREFERRED EMBODIMENTS

Hereinafter, the present invention will be described in more detail by way of illustrative examples with reference to the accompanying drawings.

Example 1

Figure 1:
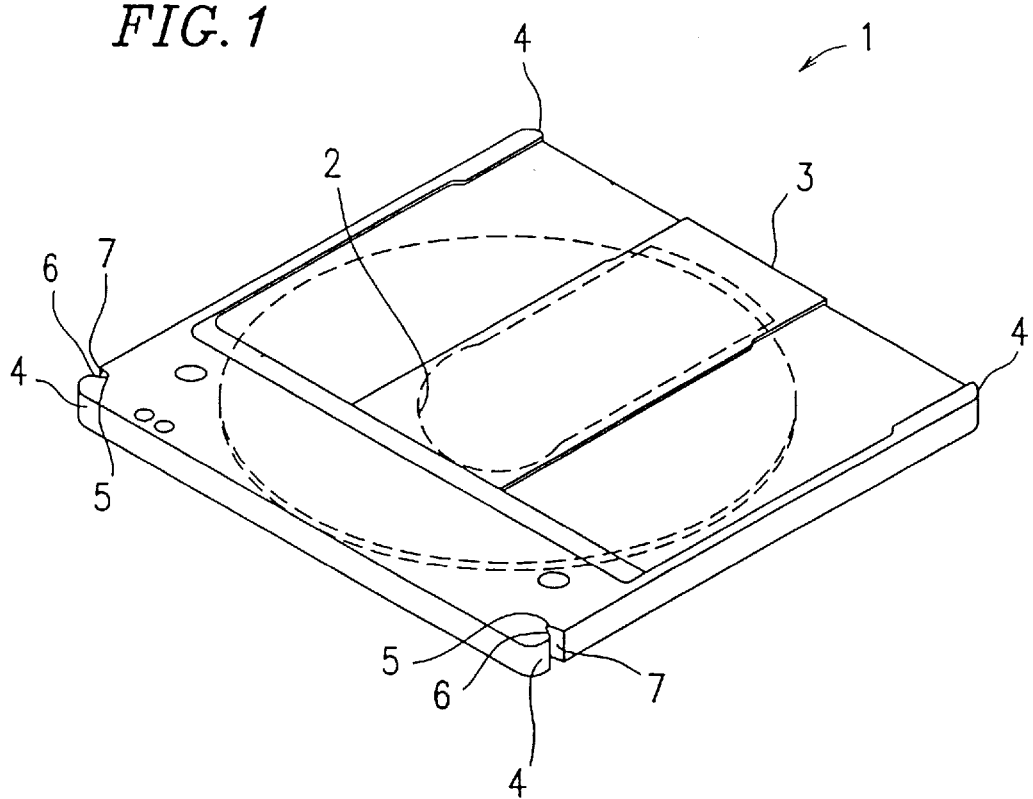
FIG. 1 is a schematic diagram illustrating a double-sided cartridge according to Example 1 of the present invention.
Figure 2:
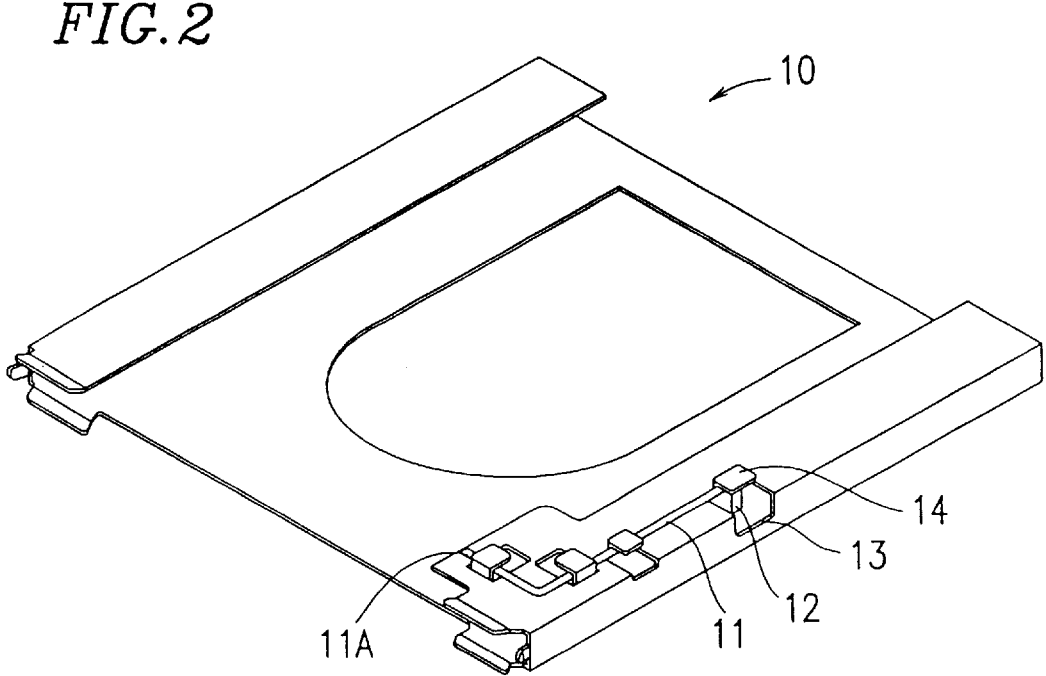
FIG. 2 is a schematic diagram illustrating a cartridge holder provided in an optical disk apparatus which receives the double-sided cartridge of Example 1.

FIG. 1 is a schematic diagram illustrating a double-sided cartridge 1 according to Example 1 of the present invention. FIG. 2 is a schematic diagram illustrating a cartridge holder 10 provided in an optical disk apparatus which receives the double-sided cartridge 1.

FIGS. 3A, 3B, 4A, 4B, 5A and 5B are diagrams illustrating how the double-sided cartridge 1 is inserted into the cartridge holder 10.

Referring to FIG. 1, the double-sided cartridge 1 accommodating an optical disk therein has a window 2 on both sides thereof for receiving a pickup of the disk drive, and a U-shaped slidable shutter 3 for opening/closing the window.

The shutter 3 is movable toward either side of the window 2, and is biased by a shutter spring (not shown) to close the window 2. As the cartridge 1 is inserted into the disk drive, the shutter 3 hits a shutter opener (not shown) provided in the disk drive, which then moves the shutter 3 to open the window 2. The same shutter opener can move the shutter 3 to open the window 2 also when the cartridge 1 is inserted with its reverse side facing up, because the shutter 3 is movable toward either side of the window 2.

All of the four corners 4 of the cartridge 1 have the same rounded shape. A mis-insertion protection slot 5 is provided along both side edges of the cartridge 1 near the rear edge (opposite to the shutter 3) thereof. The slot 5 comprises an inclined guide section 6 for guiding a mis-insertion protection pin 11 (further described later) and a stopper section 7.

Now, an operation of inserting the cartridge 1 into the cartridge holder 10 will be described. As illustrated in FIG. 2, the cartridge holder 10 is provided with the mis-insertion protection pin 11 made of a torsion spring. One end of the mis-insertion protection pin 11 is bent at about 90°, thereby forming a stopper 12, and the other end 11A is secured on an outer surface of the cartridge holder 10.

The stopper 12 extends through a guide hole 13 of the cartridge holder 10 to be present within the insertion path of the cartridge 1. The stopper 12 abuts a tab portion 14 of the cartridge holder 10 and is urged away from a side thereof by virtue of the bias of the torsion spring. In this state, the stopper 12 is designed to meet the rounded portion of the corner 4 of the cartridge 1.

Figure 3A:
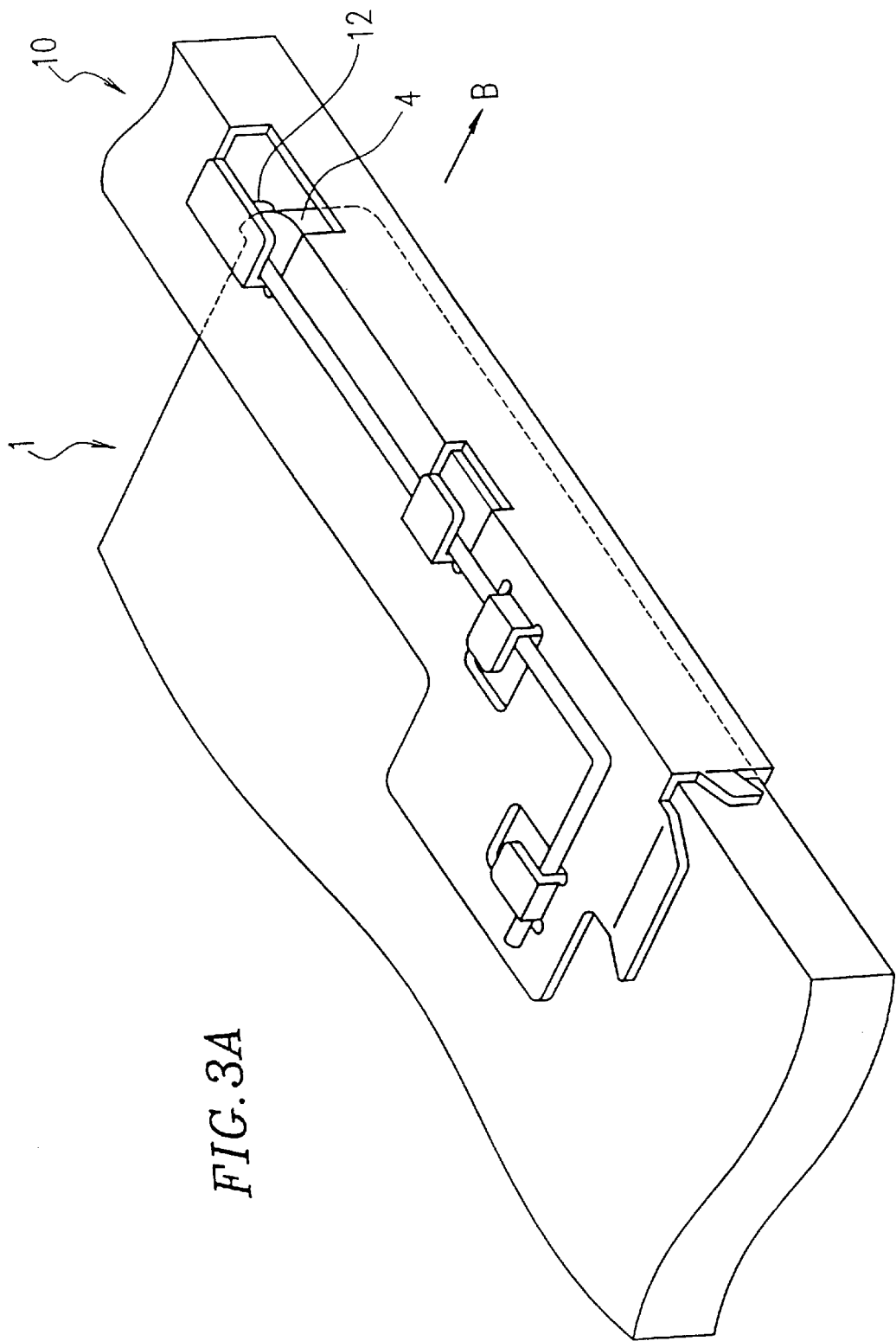
FIG. 3A is a perspective view illustrating how the double-sided cartridge of Example 1 is inserted into the cartridge holder.
Figure 3B:
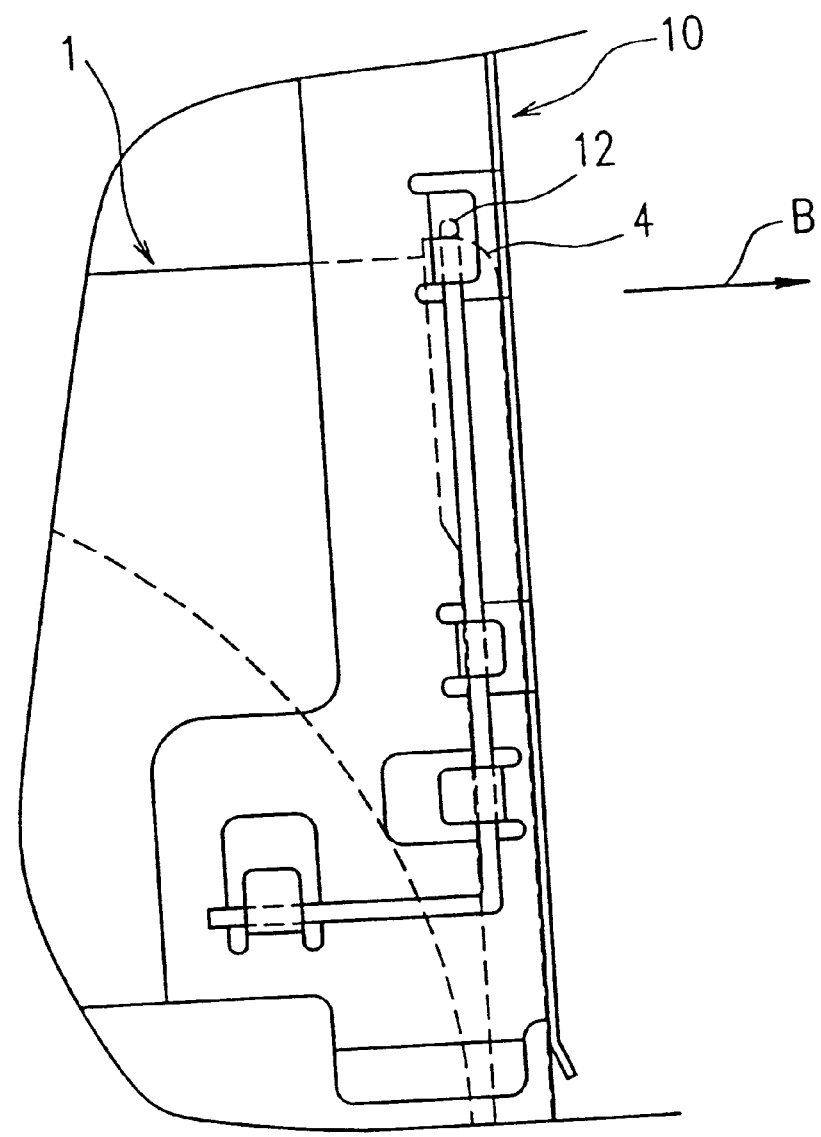
FIG. 3B is a plan view illustrating how the double-sided cartridge of Example 1 is inserted into the cartridge holder.
Figure 4A:
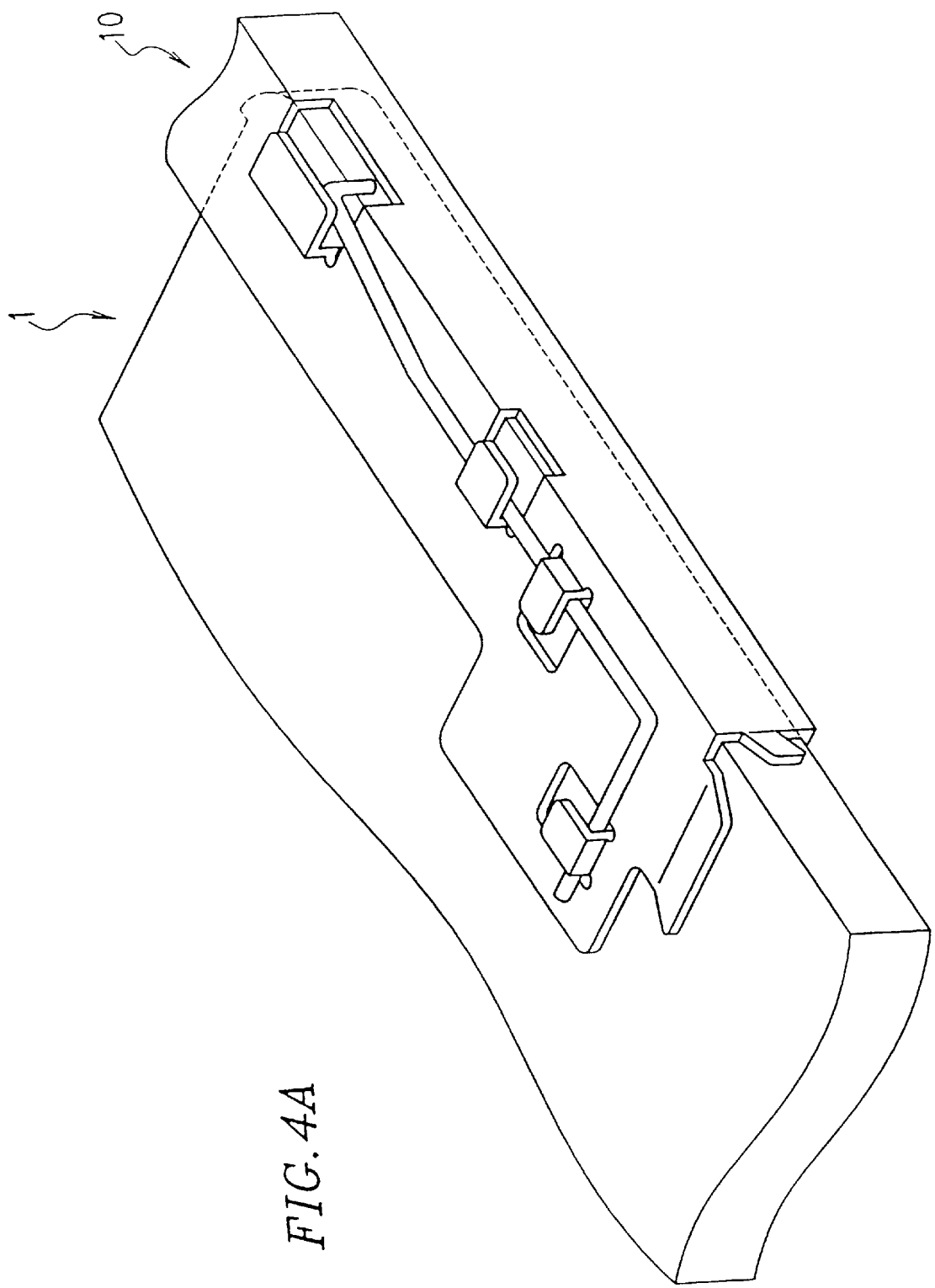
FIG. 4A is a perspective view illustrating how the double-sided cartridge of Example 1 is inserted into the cartridge holder.
Figure 4B:
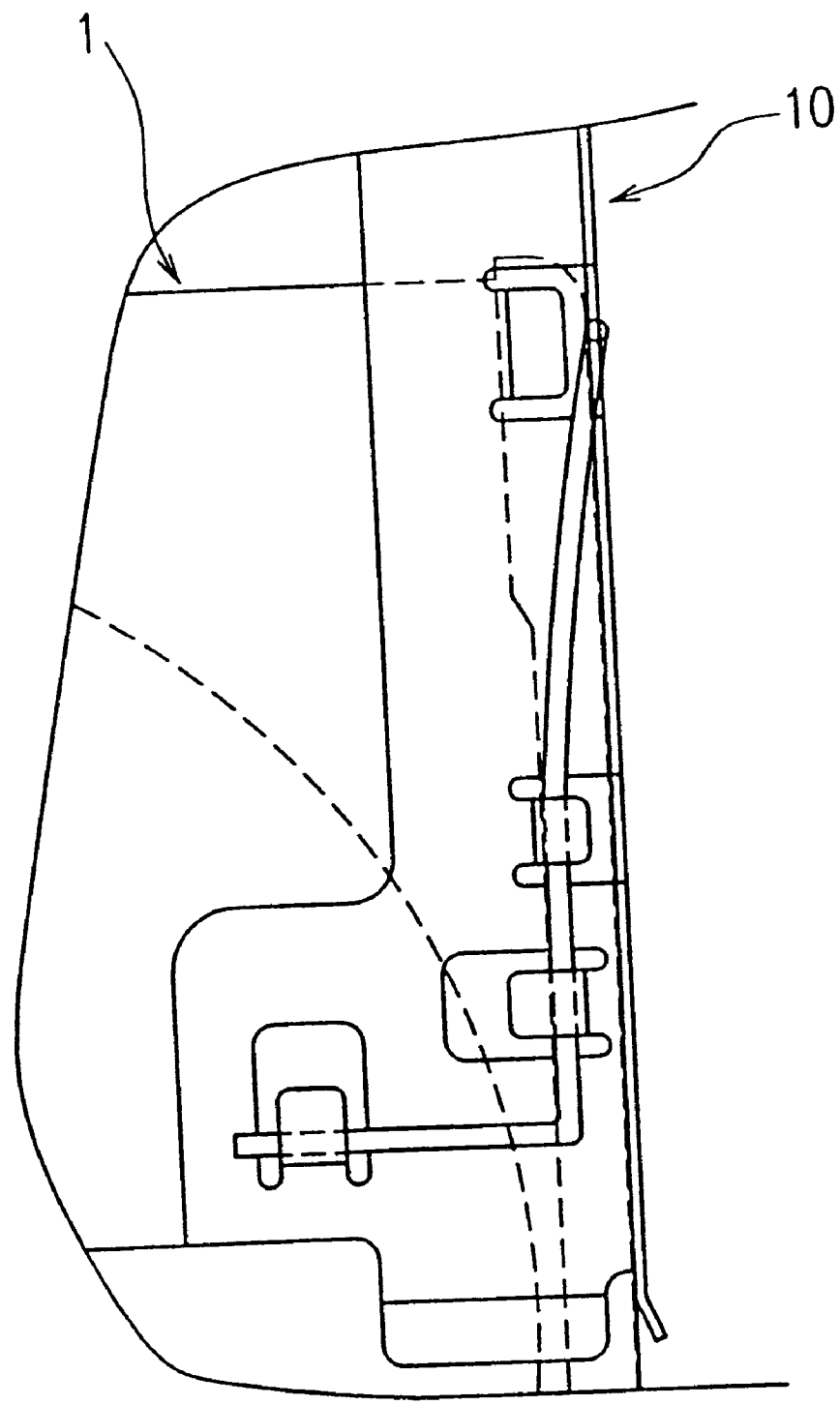
FIG. 4B is a plan view illustrating how the double-sided cartridge of Example 1 is inserted into the cartridge holder.

First, a case where the cartridge 1 is inserted correctly (in the right direction) will be described. As the cartridge 1 is inserted into the cartridge holder 10 in the right direction as illustrated in FIGS. 3A and 3B, the rounded portion of the corner 4 hits the stopper 12. Since the corner 4 has a rounded shape, the insertion of the cartridge 1 forces the stopper 12 out of the insertion path of the cartridge 1 (in the direction indicated by arrow B in FIGS. 3A and 3B), thereby resulting in a state as illustrated in FIGS. 4A and 4B, thus allowing the cartridge 1 to be inserted further into the cartridge holder 10.

Since the cartridge 1 is a double-sided cartridge, it exhibits the same profile whether it is faced up or faced down. Therefore, the cartridge 1 can of course be inserted into the cartridge holder 10 as illustrated in FIGS. 3A, 3B, 4A and 4B with the reverse side thereof facing up.

Next, a case where the cartridge 1 is inserted in a wrong direction, i.e., from the rear edge thereof, will be described referring to FIGS. 5A and 5B. Since the corners 4 on the rear edge of the cartridge 1 have the same rounded shape as that of the corners 4 on the front edge thereof, the cartridge 1 can be inserted to a certain depth into the cartridge holder 10 as illustrated in FIGS. 3A and 3B.

Figure 5B:
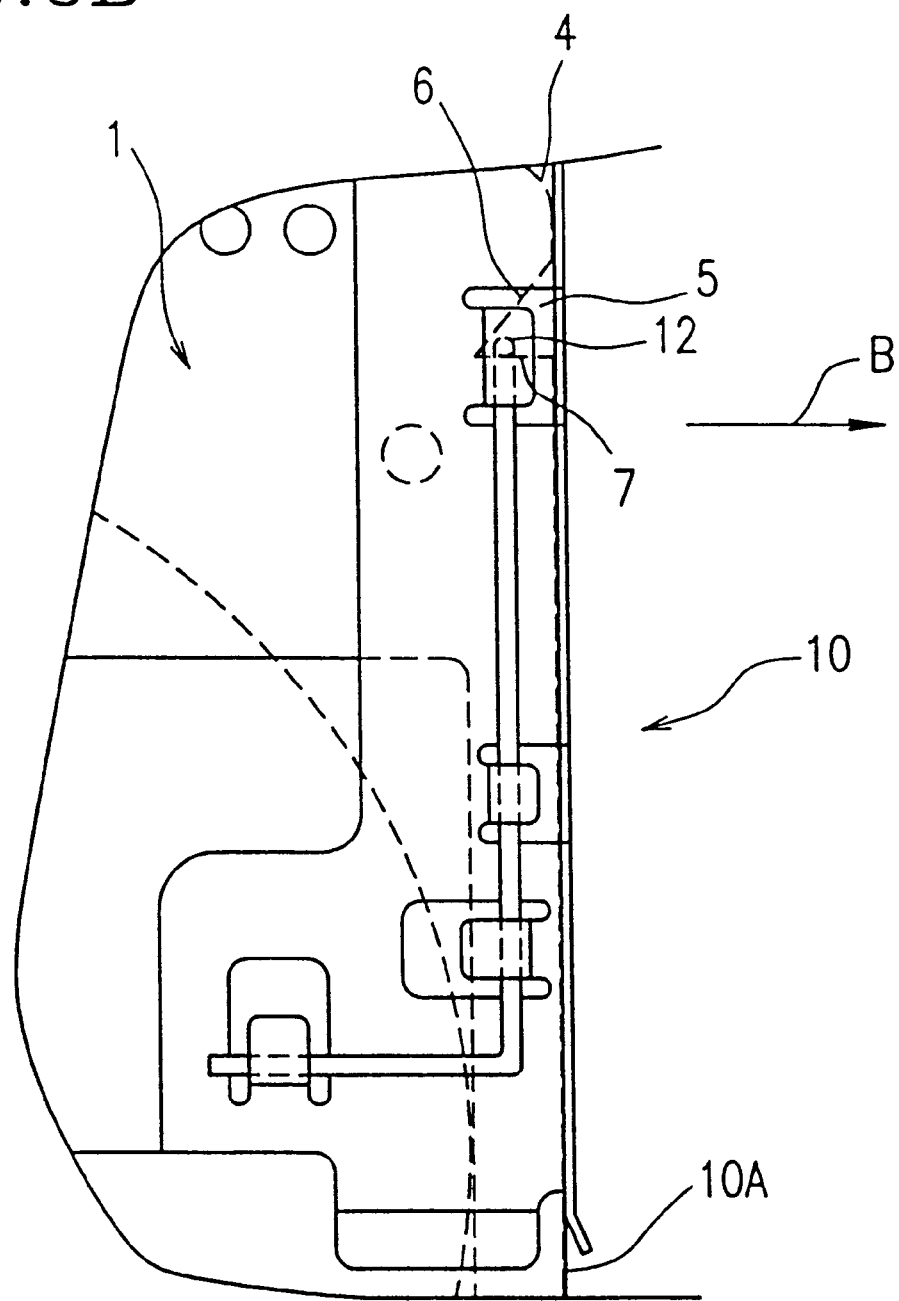
FIG. 5B is a plan view illustrating how the double-sided cartridge of Example 1 is inserted into the cartridge holder.

As the cartridge 1 is further inserted, the stopper 12 is urged into the slot 5 by virtue of the bias of the torsion spring and guided along the inclined guide section 6 of the slot 5 so as to hit the stopper section 7, as illustrated in FIGS. 5A and 5B. Since the stopper section 7 is generally perpendicular to a side surface 10A of the cartridge 1, there is no force to move the stopper 12 in the direction indicated by arrow B.

Thus, the cartridge 1 cannot be inserted further into the cartridge holder 10, thereby providing the mis-insertion protection function. Still, the cartridge 1 can be pulled out from the cartridge holder 10 as the stopper 12 is guided along the guide section 6 out of the slot 5.

The mis-insertion protection function is similarly provided when the cartridge 1 is inserted into the cartridge holder 10 from the rear edge thereof with the reverse side facing up. In this way, the mis-insertion protection mechanism can be provided separately from the corner 4 and outside the motion area of the shutter 3. Thus, desirable freedom is provided in designing the shutter 3, thereby allowing the shutter 3 motion area to be as large as that in Example 1 (see FIG. 1).

Example 2

Figure 6:
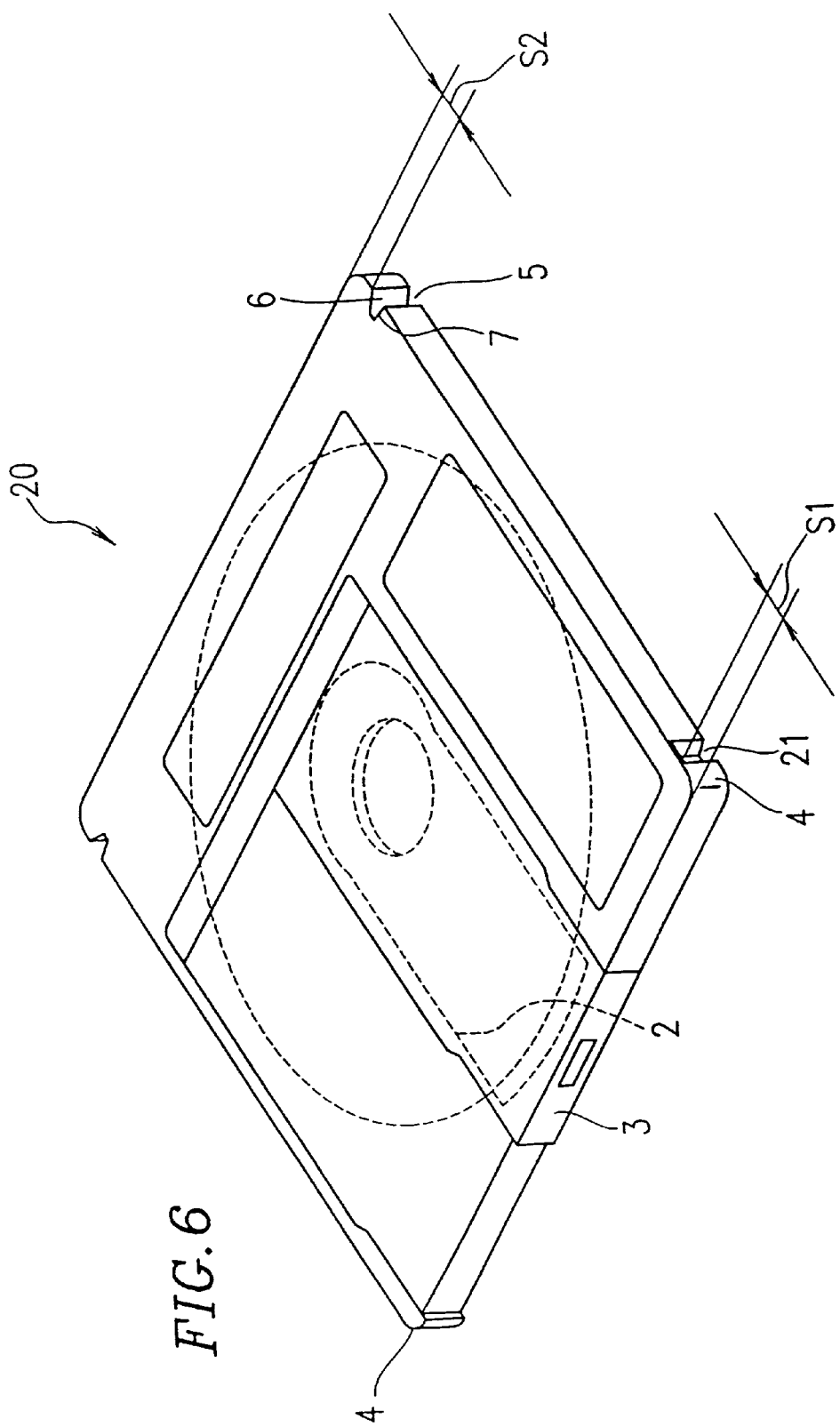
FIG. 6 is a schematic diagram illustrating a single-sided cartridge according to Example 2 of the present invention.
Figure 7:
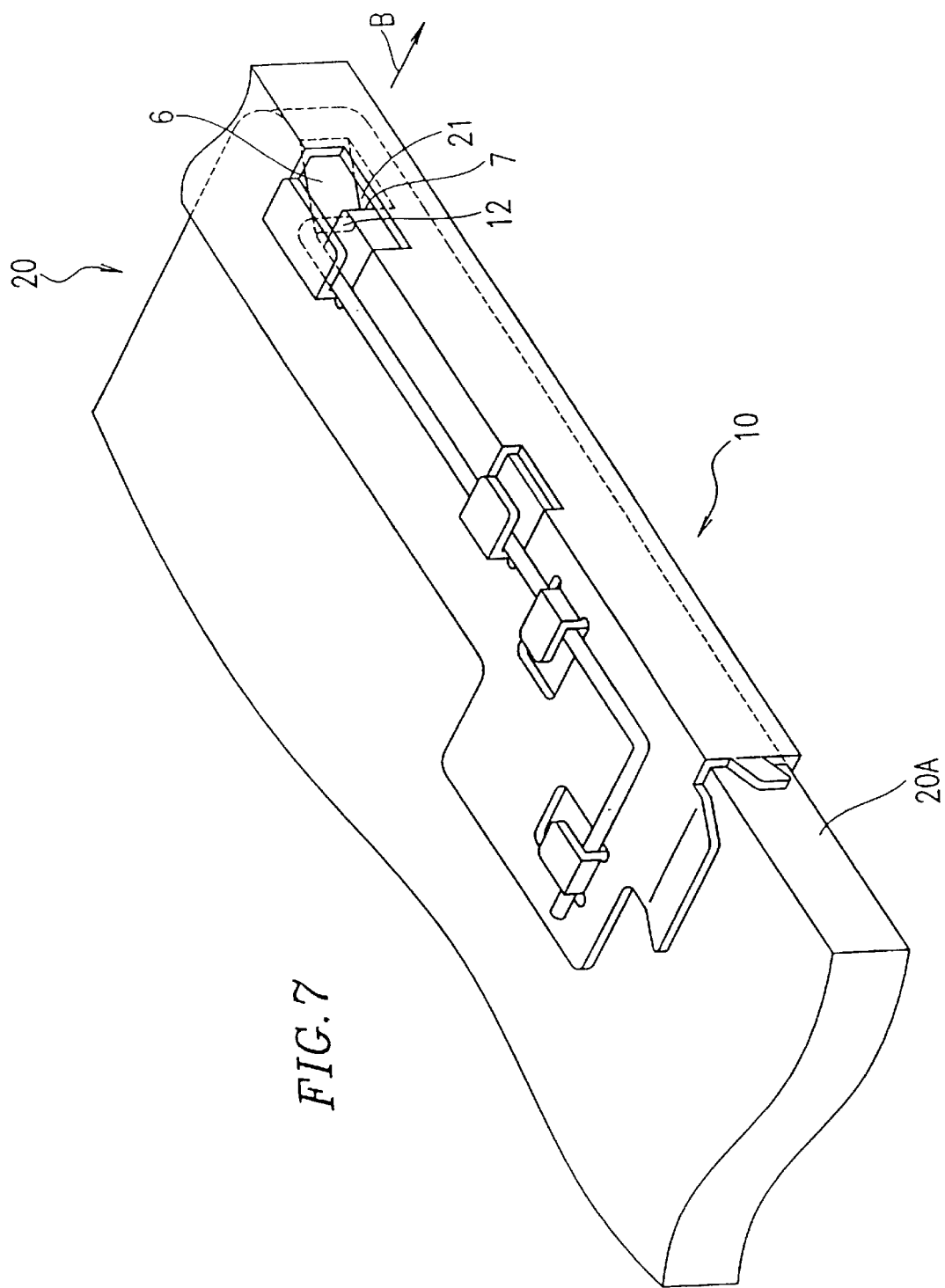
FIG. 7 is a perspective view illustrating a mis-insertion of the single-sided cartridge of Example 2.

FIG. 6 is a schematic diagram illustrating a first single-sided cartridge 20 according to Example 2 of the present invention. FIG. 7 is a diagram illustrating a mis-insertion of the first single-sided cartridge 20. In FIGS. 6 and 7, like reference numerals to those in the previously discussed figures denote like elements, will not further be described below.

The first single-sided cartridge 20 is generally the same as the double-sided cartridge 1 according to Example 1 except for the following points. First, the shutter 3 is movable toward only one side of the window 2 because the cartridge 20 is a single-sided cartridge. Moreover, a second slot 21, having a similar shape to that of the mis-insertion protection slot 5, is provided along one side edge of the cartridge 20 near the front edge thereof. The side on which the second slot 21 is provided is opposite to the side toward which the shutter is moved to open the window 2. The second slot 21 is different from the slot 5 in that the second slot 21 does not extend through the thickness of the cartridge 20. The distance Sl between the second slot 21 and the front edge of the cartridge 20 is generally the same as the distance S2 between the slot 5 and the rear edge of the cartridge 20.

Referring to FIG. 7, a mis-insertion protection function will be described, which is provided when the single-sided cartridge 20 is inserted into the cartridge holder 10 from the front edge, but with the reverse (wrong) side thereof facing up. The cartridge 20 is inserted to a certain depth into the cartridge holder 10 as illustrated in FIGS. 3A and 3B. As the cartridge 20 is further inserted, the stopper 12 is urged into the second slot 21 by virtue of the bias of the torsion spring and guided along the inclined guide section 6 of the second slot 21 so as to hit the stopper section 7, as illustrated in FIG. 7. Since the stopper section 7 is generally perpendicular to a side surface 20A of the cartridge 20, there is no force to move the stopper 12 in the direction indicated by arrow B.

Therefore, the cartridge 20 cannot be inserted any further, thereby providing the mis-insertion protection function.

In other directions, the single-sided cartridge 20 is inserted into the cartridge holder 10 as described above with respect to the double-sided cartridge 1 in Example 1.

By such a structure, the single-sided cartridge 20 is prevented from being inserted into the cartridge holder 10 with the reverse side thereof facing up. As described above, the slots 5 and 21 are located at generally the same distance (SI and S2) respectively from the front edge and the rear edge of the cartridge 20, thereby stopping the mis-inserted cartridge 20 at generally the same depth in the cartridge holder 10. Thus, a user can easily recognize the mis-insertion.

Moreover, as in Example 1, the slots 5 and 21 can be provided separately from the corner 4 and outside the motion area of the shutter 3, thereby facilitating the cartridge design.

Furthermore, in Example 2, the second slot 21 does not extend to the front or upper surface of the cartridge 20, so that the single-sided cartridge 20, as viewed from the front side, exhibits the same profile as that of a double-sided cartridge, thereby adding an aesthetic advantage to the cartridge 20. Functionally, however, the second slot 21 may of course extend through the thickness of the cartridge 20.

While all of the four corners of the cartridge 20 are rounded in Example 2, the corners may have any other shape as long as the mis-insertion protection pin in the disk drive can be appropriately guided around the corners.

Example 3

Figure 8:
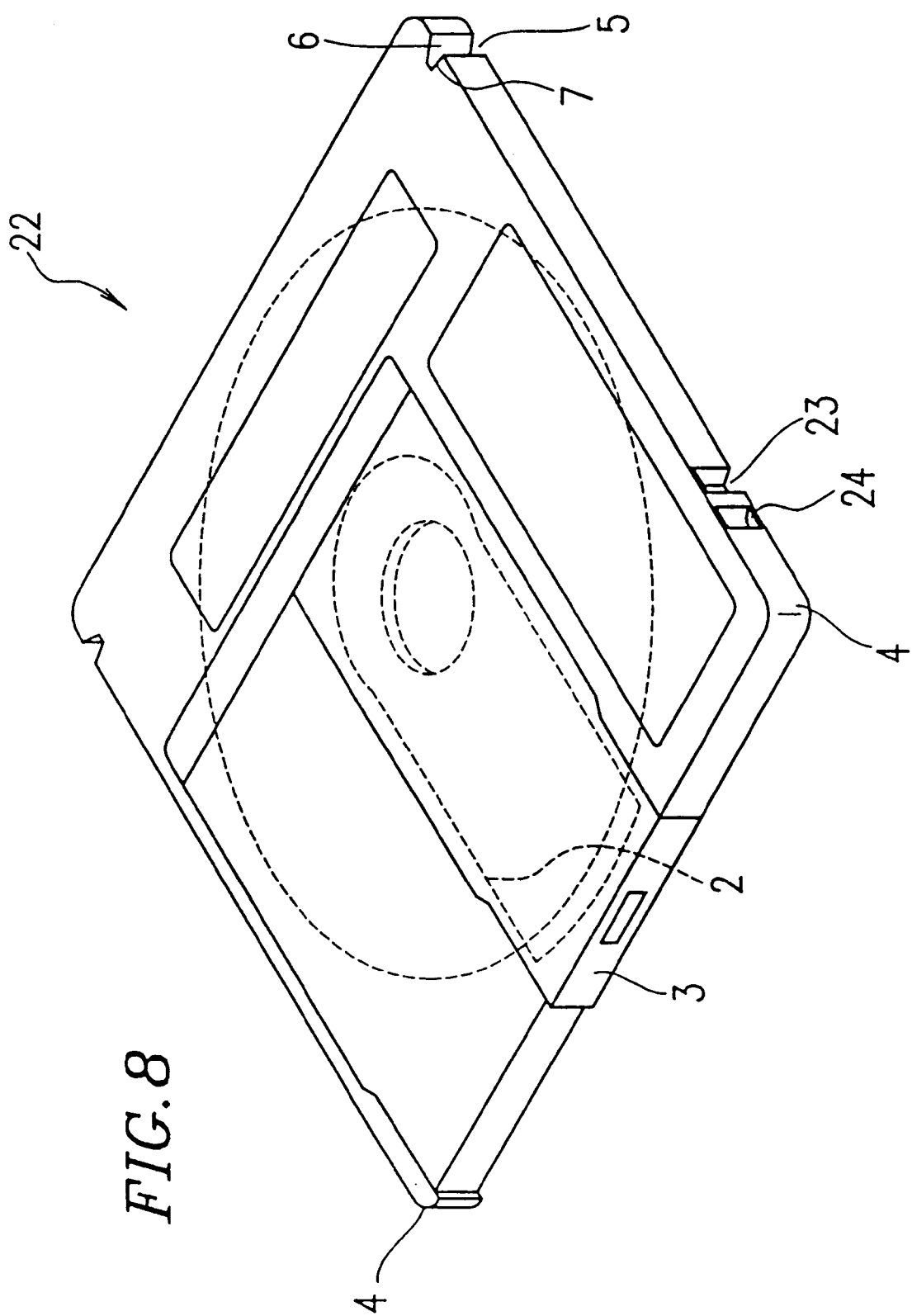
FIG. 8 is a schematic diagram illustrating a single-sided cartridge according to Example 3 of the present invention.
Figure 9:
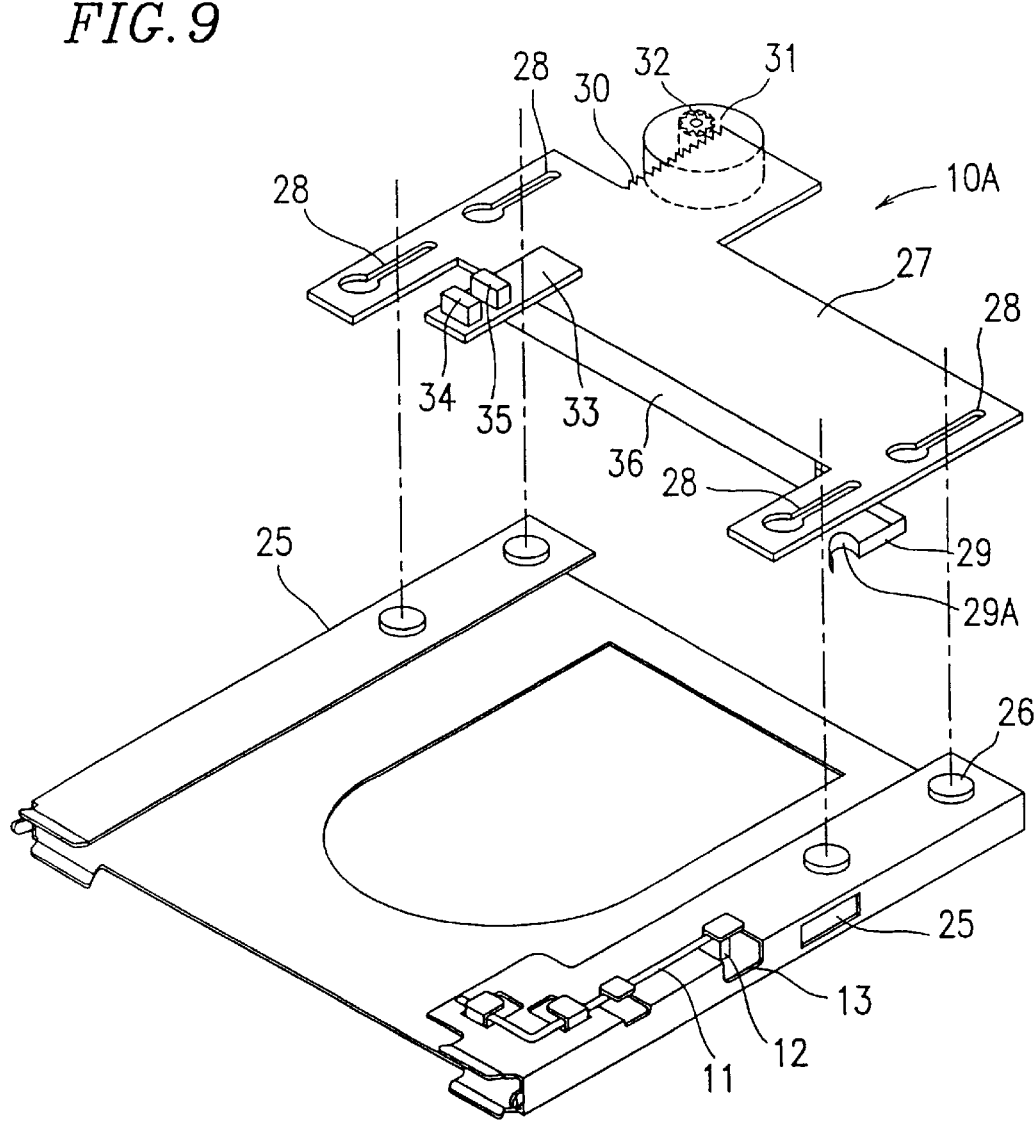
FIG. 9 is an exploded perspective view illustrating a cartridge holder provided in an optical disk apparatus which receives the single-sided cartridge of Example 3.
Figure 10:
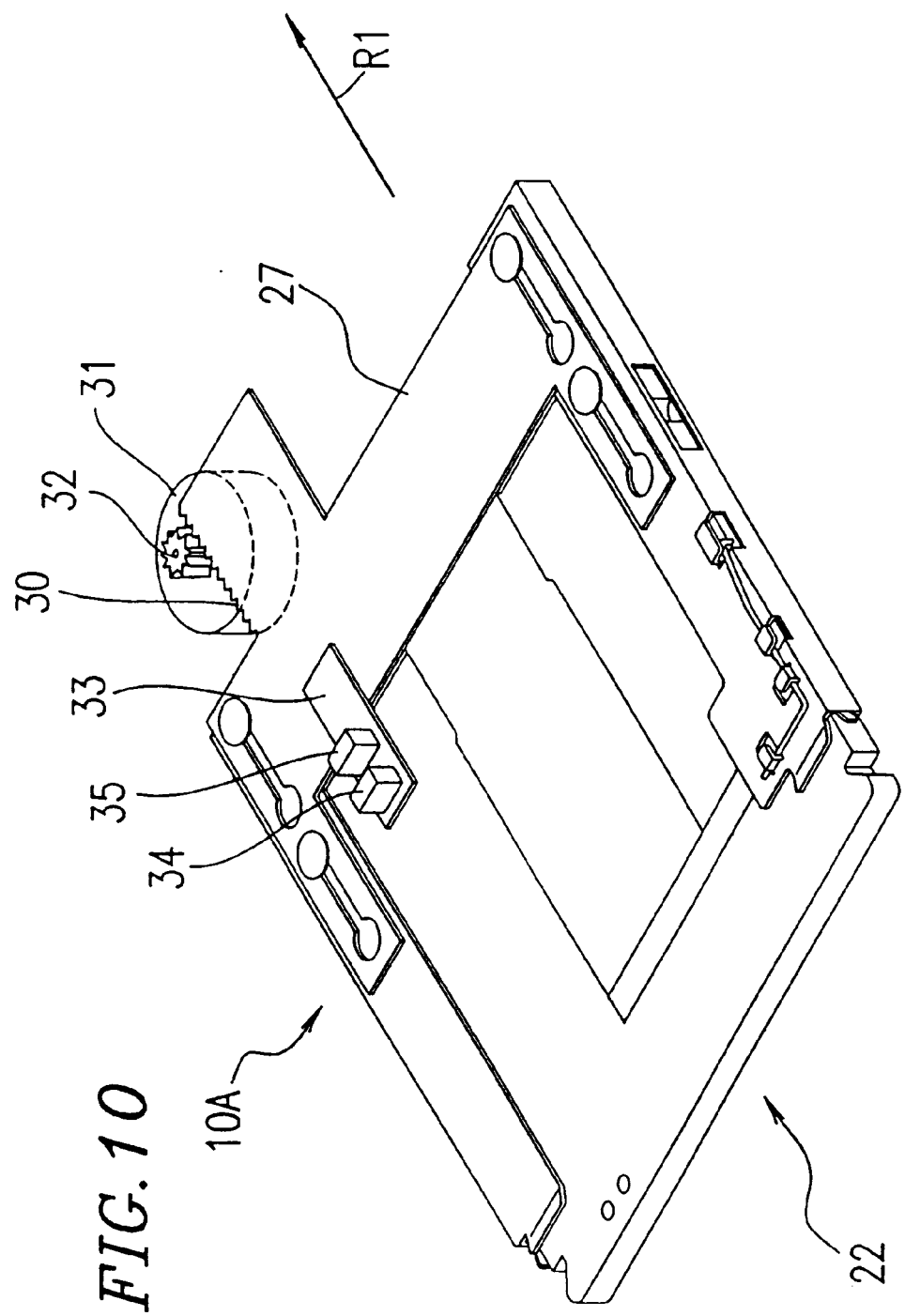
FIG. 10 is a perspective view illustrating how the single-sided cartridge of Example 3 is inserted into the cartridge holder.
Figure 11:
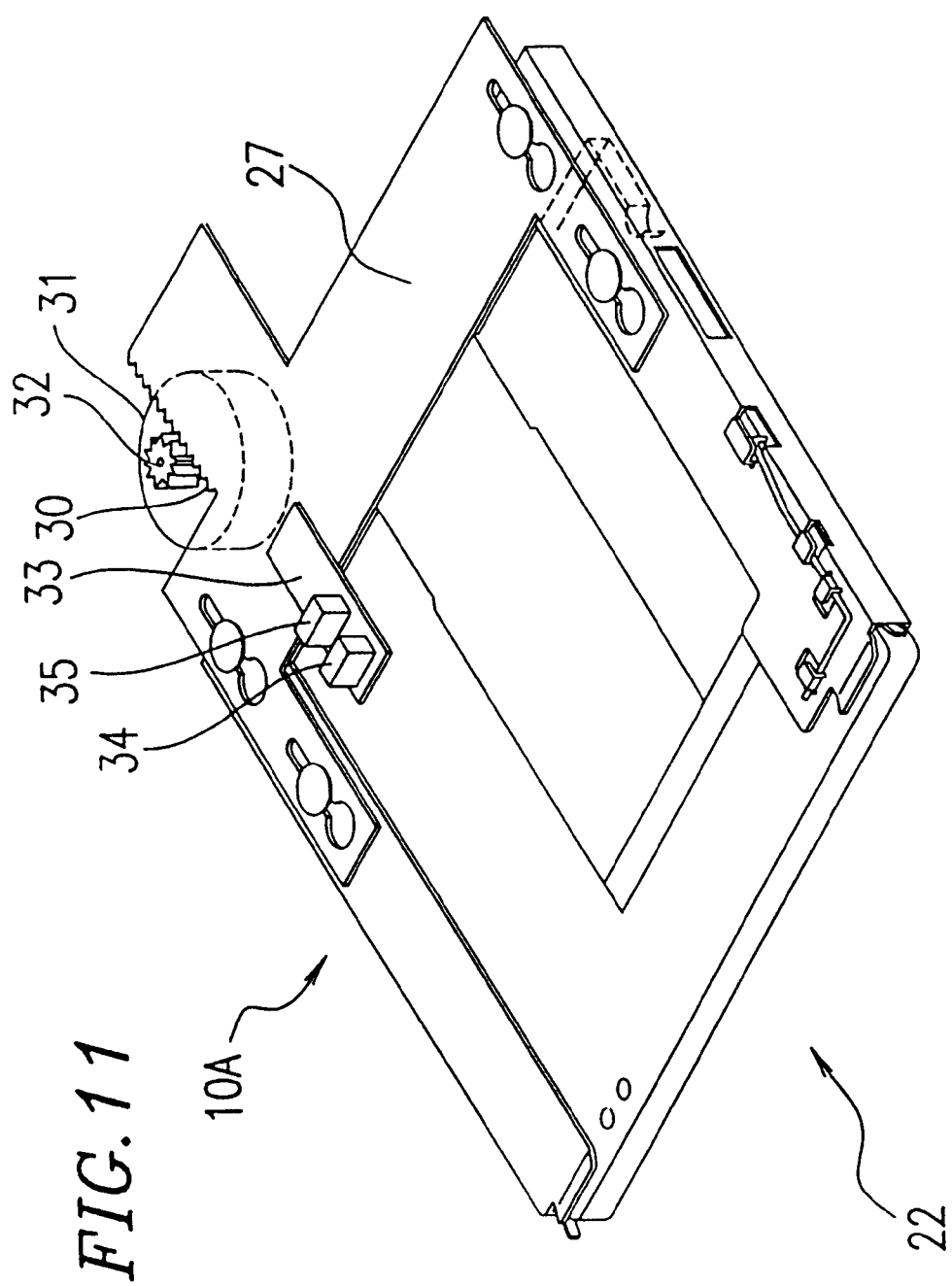
FIG. 11 is a perspective view illustrating how the single-sided cartridge of Example 3 is inserted into the cartridge holder.
Figure 12:
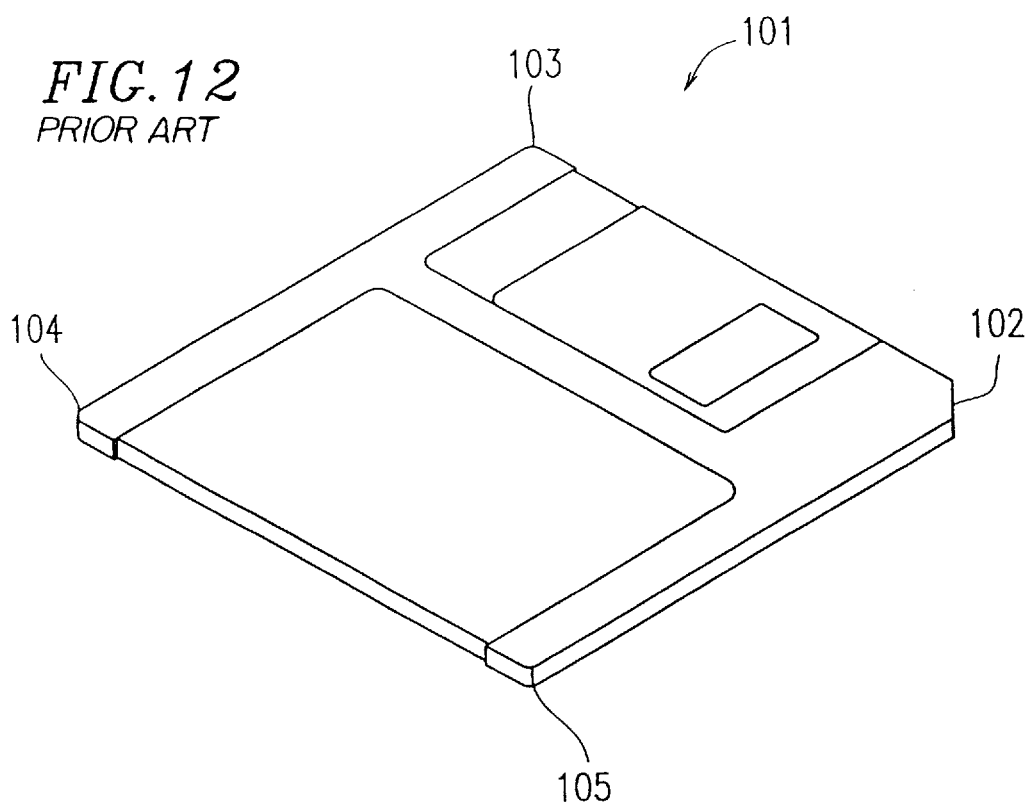
FIG. 12 is a schematic diagram illustrating a conventional single-sided cartridge.
Figure 13:
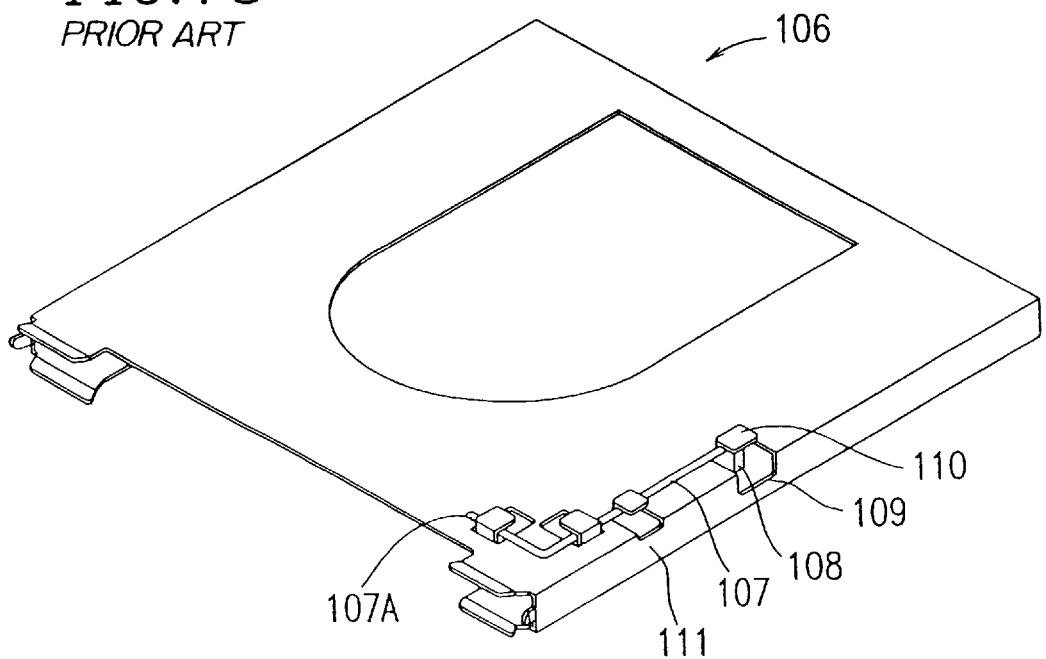
FIG. 13 is a schematic diagram illustrating a cartridge holder provided in an optical disk apparatus which receives the conventional single-sided cartridge.
Figure 14:
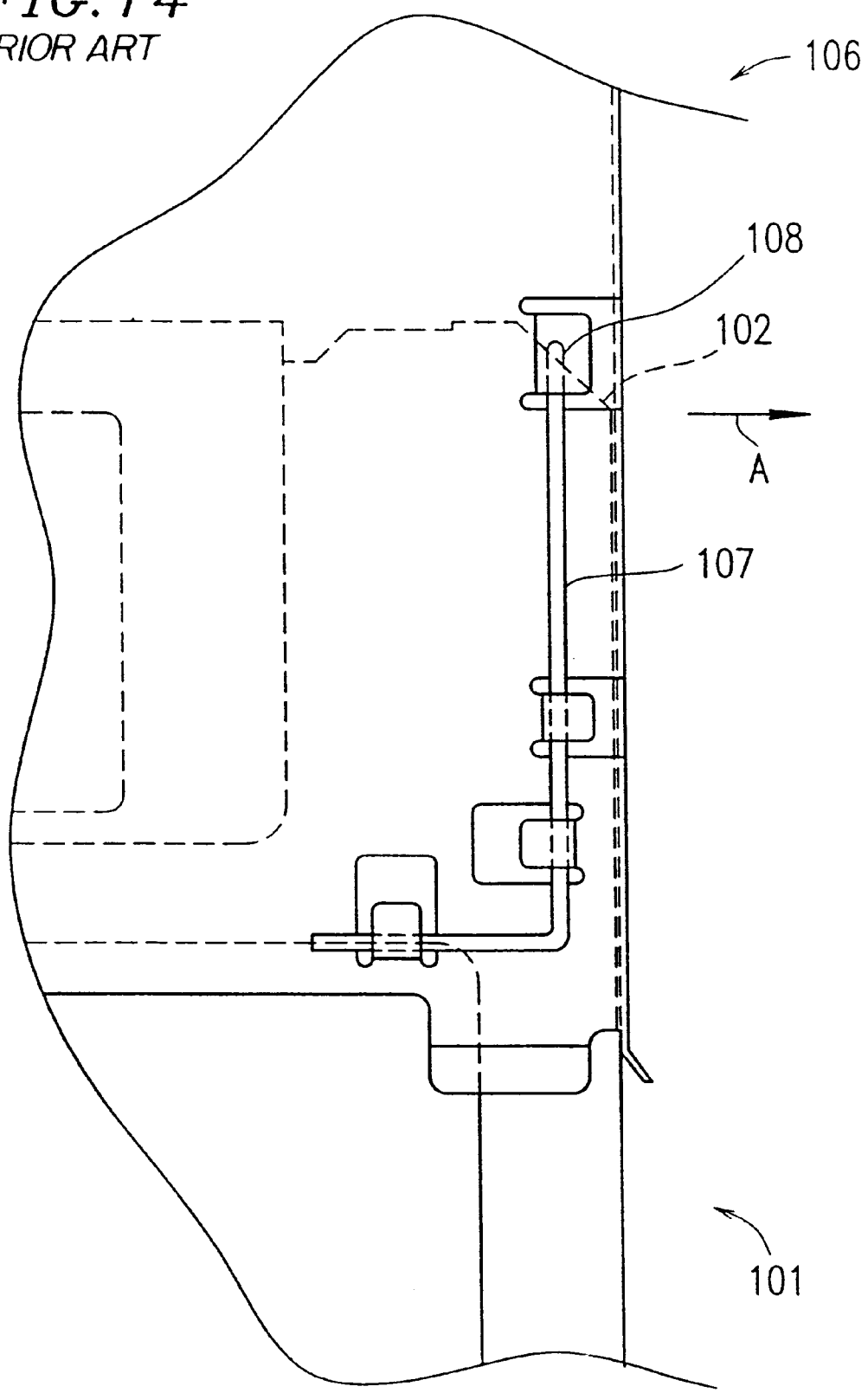
FIG. 14 is a plan view illustrating how the conventional single-sided cartridge is inserted into the cartridge holder.
Figure 15:
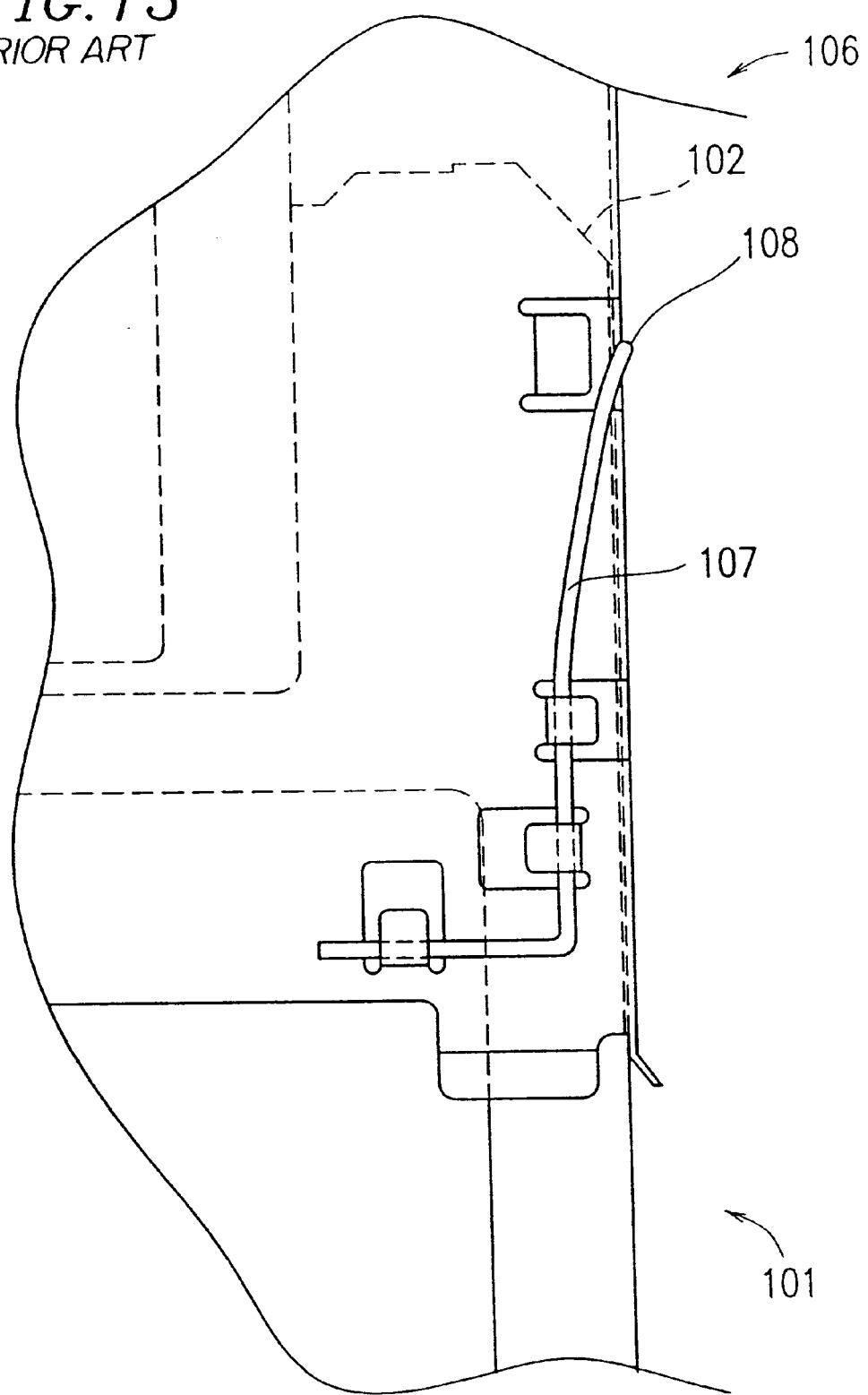
FIG. 15 is a plan view illustrating how the conventional single-sided cartridge is inserted into the cartridge holder.
Figure 16:
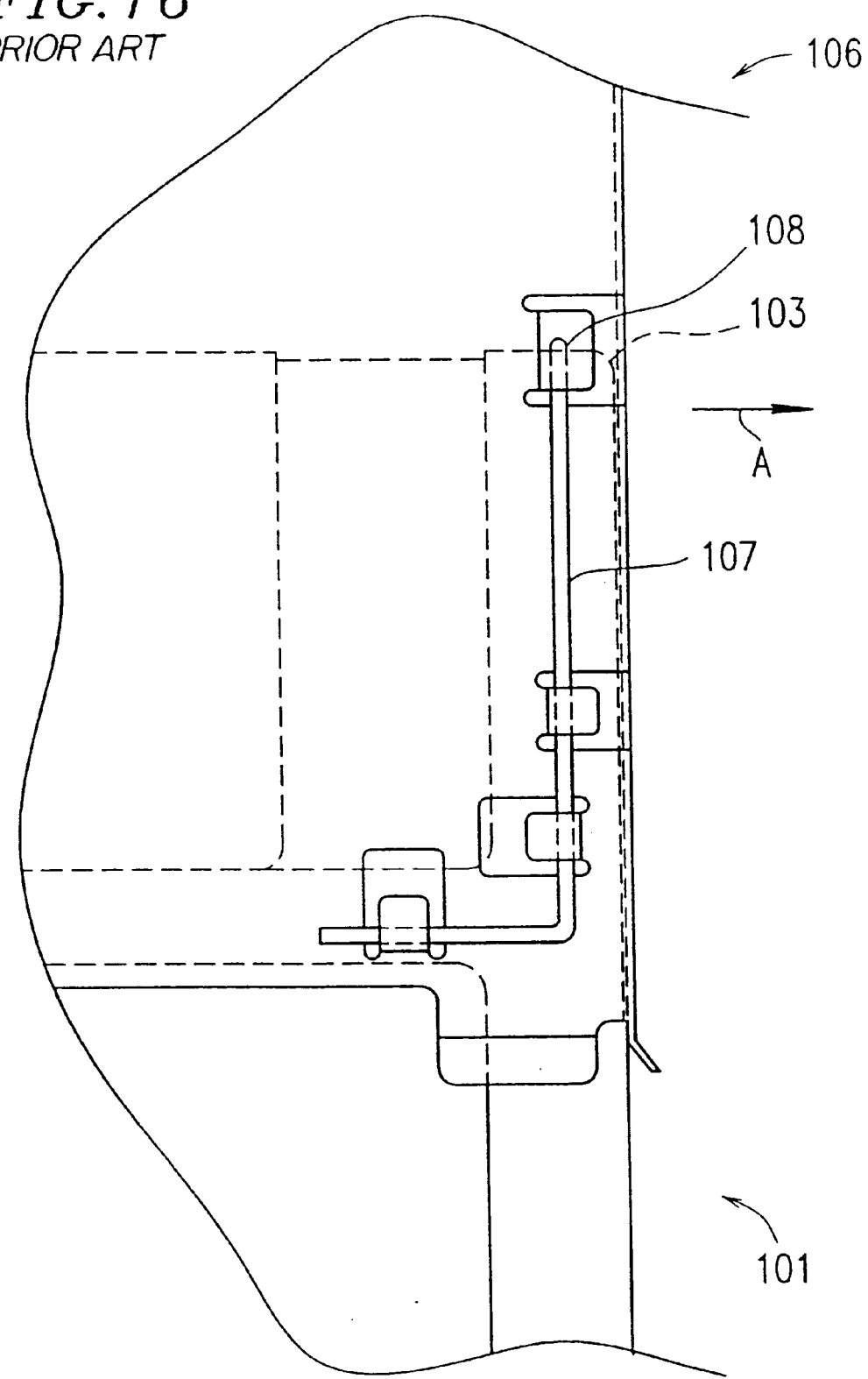
FIG. 16 is a plan view illustrating how the conventional single-sided cartridge is inserted into the cartridge holder.
Figure 17:
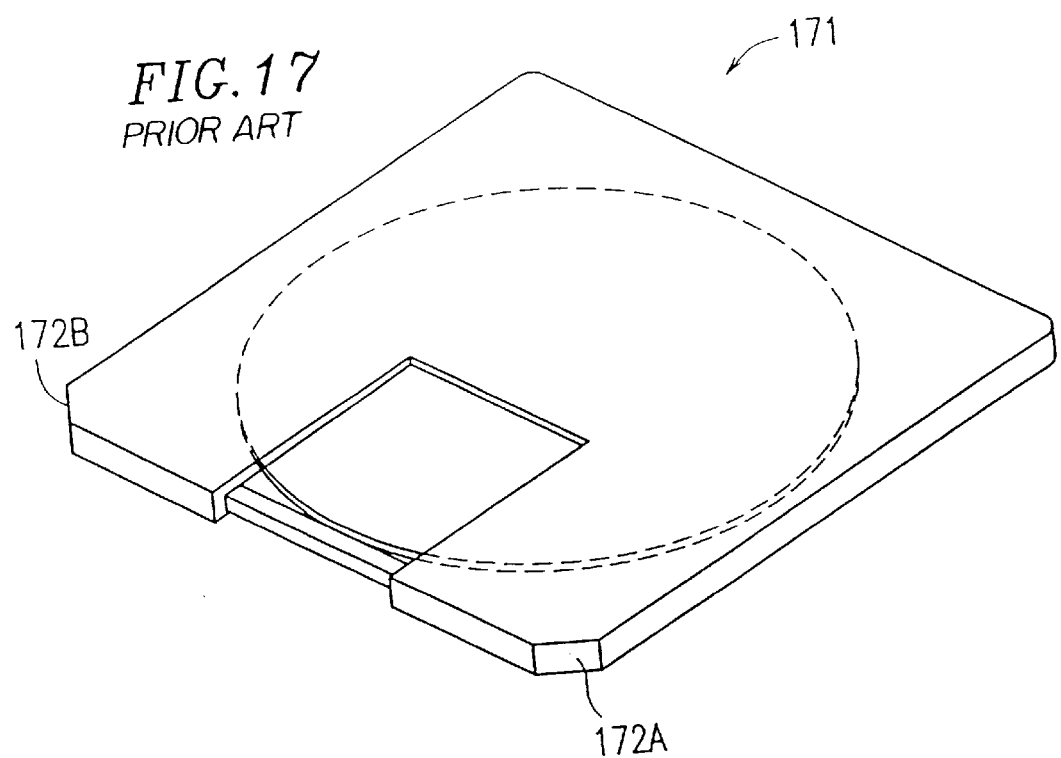
FIG. 17 is a schematic diagram illustrating a conventional double-sided cartridge.

FIG. 8 is a schematic diagram illustrating a second single-sided cartridge 22 according to Example 3 of the present invention. FIG. 9 is a schematic diagram illustrating a cartridge holder 10A of an optical disk apparatus which receives the second single-sided cartridge 22. FIGS. 10 and 11 are diagrams illustrating how the second single-sided cartridge 22 is inserted into the cartridge holder 10A. In FIGS. 8 to 11, like reference numerals to those in the previously discussed figures denote like elements, will not further be described below.

The second single-sided cartridge 22 is generally the same as the first single-sided cartridge 20 according to Example 2 except for the following points. The single-sided cartridge 22 has a concave auto-loading slot 24 provided along both side edges of the cartridge 22 near the front edge thereof, with a second slot 23 being provided on the rear side of the auto-loading slot 24 (The second slot 23 is generally the same in shape as the second slot 21 of Example 2). The auto-loading slot 24 engages with an auto-loading mechanism (further described later) provided in the optical disk apparatus to automatically load the cartridge 22 into the apparatus.

Next, the cartridge holder 10A having the autoloading mechanism will be described below. Referring to FIG. 9, the cartridge holder 10A includes a window 25 on both side surfaces thereof and a plurality of pins 26 provided integrally on the upper surface. The cartridge holder 10A further includes a movable plate 27, which is provided with a plurality of elongated guide grooves 28 respectively engaging with the pins 26. The movable plate 27 also includes a bent portion 36. A plate spring 29, having an engagement protrusion 29A at the tip thereof, is provided at both ends of the bent portion 36.

A rack 30 is provided on the rear side of the movable plate 27. The rack 30 meshes with a pinion gear 32 fit around a shaft of a motor 31 which is fixed in the apparatus. The movable plate 27 further includes a detection section 33. A first sensor 34 and a second sensor 35, both of which are light emitting-receiving devices, are fixed on the detection section 33. Such a light emitting-receiving device can emit light downwardly so as to detect if the cartridge 22 is present under the light emitting-receiving device by detecting light reflected by the cartridge 22.

The auto-loading operation will now be described. When the cartridge 22 is inserted into the cartridge holder 10A in a predetermined (right) direction, the corner 4 of the cartridge 22 hits the stopper 12, as described above in Example 1, thereby moving the stopper 12 out of the insertion path of the cartridge 22. The cartridge 22 is inserted further into the cartridge holder 10A while one side surface abuts the stopper 12. Since the auto-loading slot 24 is in a concave shape which does not extend to the upper surface of the cartridge 22, the stopper 12 passes over, and is not urged into, the auto-loading slot 24.

As the cartridge 22 is inserted further into the cartridge holder 10A, the presence of the cartridge 22 is detected by the first sensor 34 and then by the second sensor 35 of the detection section 33. Meanwhile, the engagement protrusion 29A of the plate spring 29 is pushed by the corner 4 of the cartridge 22 out of the insertion path of the cartridge 22 through the window 25, and then slides against the side surface of the cartridge 22. As the cartridge 22 is inserted further into the cartridge holder 10A, the engagement protrusion 29A engages into the auto-loading slot 24 of the cartridge 22 by virtue of the resilient force of the plate spring 29, thereby holding the cartridge 22.

FIG. 10 illustrates the cartridge 22 upon completion of the manual loading of the cartridge 22 into the cartridge holder 10A. The first sensor 34 and the second sensor 35 of the detection section 33 successively detect the cartridge 22 with a predetermined time lag therebetween. Thus, the motor 31 is activated and starts rotating the pinion gear 32. The rotary force is transferred to the rack 30, thereby moving the movable plate 27 rearwardly (in the direction indicated by arrow R1) along with the cartridge 22 being held by the movable plate 27.

After moving the movable plate 27 for a certain distance, the motor 31 stops, thereby completing the auto-loading operation. FIG. 11 illustrates the cartridge 22 upon completion of the auto-loading operation. By employing such an auto-loading operation, it is possible to improve the user's operational feeling.

When the cartridge 22 is inserted with the reverse side thereof facing up, the stopper 12 (FIG. 9) passes over the auto-loading slot 24 (FIG. 8) and then hits the stopper section 7 of the second slot 23 (FIG. 8), thereby providing the mis-insertion protection function.

As described above, the second single-sided cartridge 22 has the auto-loading slot 24 shaped in a concave shape, so that the cartridge 22 provided with the mis-insertion protection slot 23 along the side surface thereof can be automatically loaded.

According to the present invention, a mis-insertion protection mechanism as described above is provided along one or both of the side edges of the cartridge, thereby successfully providing a reliable mis-insertion protection function to a disk cartridge, in which it is difficult to differentiate the respective shapes of the corners from one another.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A cartridge accommodating a disk therein, wherein:
   the cartridge has a rectangular shape having first to fourth corners;
   at least two mis-insertion protection mechanisms are provided each at a position which is on a side surface section of the cartridge and which is spaced apart from each of the first to fourth corners, the at least two mis-insertion protection mechanisms being provided for preventing the cartridge from being inserted into a cartridge holder in a wrong direction;
   each of the first to fourth corners is shaped so as to allow for the cartridge to be inserted into the cartridge holder;
   the side surface section has a first side surface and a second side surface each being formed in a direction which is substantially perpendicular to a surface of the disk and substantially parallel to a direction in which the cartridge is inserted into the cartridge holder;
   the at least two mis-insertion protection mechanisms comprise a first mis-insertion protection mechanism provided in the first side surface and a second mis-insertion protection mechanism provided in the second side surface;
   the cartridge holder has a mis-insertion protection member provided within an insertion path along which the cartridge is inserted into the cartridge holder;
   each of the first to fourth corners is shaped so as to abut the mis-insertion protection member to move the mis-insertion protection member out of the insertion path; and
   each of the first and second mis-insertion protection mechanisms is shaped so as to engage with the mis-insertion protection member.

2. A cartridge according to claim 1, wherein:
   the first mis-insertion protection mechanism has a first slot formed in the first side surface; and
   the second mis-insertion protection mechanism has a second slot formed in the second side surface.

3. A cartridge according to claim 2, wherein the first slot includes:
   a first inclined guide section comprising a surface inclined with respect to the first side surface for guiding the mis-insertion protection member; and
   a first stopper arranged substantially perpendicular to the first side surface for contacting the mis-insertion protection member to prevent the cartridge from being mis-inserted, and the second slot includes:
   a second inclined guide section comprising a surface inclined with respect to the second side surface for guiding the mis-insertion protection member; and
   a second stopper arranged substantially perpendicular to the second side surface for contacting the mis-insertion protection member to prevent the cartridge from being mis-inserted.

4. A cartridge according to claim 1, wherein the cartridge is a double-sided cartridge.

5. A cartridge according to claim 1, wherein a third mis-insertion protection mechanism is further provided in either the first side surface or the second side surface for preventing the cartridge from being inserted into the cartridge holder in a wrong direction.

6. A cartridge according to claim 1, wherein:
   the first corner is adjacent to the first side surface and the second corner is adjacent to the second side surface; and
   a distance between the first mis-insertion protection mechanism and the first corner is substantially equal to a distance between the second mis-insertion protection mechanism and the second corner.

7. A cartridge according to claim 1, wherein:
   the third corner is adjacent to the first side surface, and the fourth corner is adjacent to the second side surface; and
   a distance between the first mis-insertion protection mechanism and the first corner is substantially equal to a distance between the third mis-insertion protection mechanism and the third or fourth corner.

8. A cartridge according to claim 1, wherein the cartridge is a single-sided cartridge.

9. A cartridge according to claim 1, wherein:
   the cartridge further comprises an opening and a shutter for opening/closing the opening; and
   the at least two mis-insertion protection mechanisms are formed outside of a motion area of the shutter.

10. A cartridge according to claim 9, wherein the shutter is movable toward either side of the opening.

11. A cartridge according to claim 9, wherein the shutter is movable toward only one side of the opening.

12. An auto-loading device for loading a cartridge according to claim 1, wherein:
    the auto-loading device comprises:
      a cartridge holder for holding the cartridge; and
      an auto-loading mechanism for loading the cartridge; and
    the cartridge holder includes a mis-insertion protection member shaped so as to engage with each of the at least two mis-insertion protection mechanisms.

13. An auto-loading device according to claim 12, wherein the auto-loading mechanism further includes a detector for detecting the cartridge.

14. A cartridge accommodating a disk therein, wherein:
    the cartridge has a rectangular shape having first to fourth corners;
    at least three mis-insertion protection mechanisms are provided each at a position which is on a side surface section of the cartridge and which is spaced apart from each of the first to fourth corners, the at least three mis-insertion protection mechanisms being provided for preventing the cartridge from being inserted into a cartridge holder in a wrong direction;
    a first concave-shaped auto-loading slot and a second concave-shaped auto-loading slot are provided in the side surface section;
    each of the first to fourth corners is shaped so as to allow for the cartridge to be inserted into the cartridge holder;
    the side surface section has a first side surface and a second side surface each being formed in a direction which is substantially perpendicular to a surface of the disk and substantially parallel to a direction in which the cartridge is inserted into the cartridge holder;

the at least three mis-insertion protection mechanisms include a first mis-insertion protection mechanism provided in the first side surface, a second mis-insertion protection mechanism provided in the second side surface, and a third mis-insertion protection mechanism provided in the first side surface;

the first auto-loading slot is provided in the first side surface and the second auto-loading slot is provided in the second side surface;

the first auto-loading slot is provided on an opposite side of the first mis-insertion protection mechanism with respect to the third mis-insertion protection mechanism;

the cartridge holder has a mis-insertion protection member located within an insertion path along which the cartridge is inserted into the cartridge holder;

each of the first to fourth corners is shaped so as to abut the mis-insertion protection member to move the mis-insertion protection member out of the insertion path;

each of the first, second and third mis-insertion protection mechanisms is shaped so as to engage with the mis-insertion protection member; and the first auto-loading slot is located such that the mis-insertion protection member engages with the third mis-insertion protection mechanism after the mis-insertion protection member passes over the first auto-loading slot.

15. A cartridge according to claim 14, wherein the cartridge is a single-sided cartridge.

16. An auto-loading device for loading a cartridge according to claim 14, wherein:

the auto-loading device comprises:

a cartridge holder for holding the cartridge; and an auto-loading mechanism for loading the cartridge;

the cartridge holder includes a mis-insertion protection member which is shaped so as to engage with each of the at least three mis-insertion protection mechanisms; and the auto-loading mechanism includes a first engagement protrusion and a second engagement protrusion for engaging with the first and second autoloading slots, respectively.

17. An auto-loading device according to claim 16, wherein the auto-loading mechanism further includes a detector for detecting the cartridge.

18. An auto-loading device according to claim 17, wherein:

the auto-loading mechanism further comprises a movable plate coupled with the first and second engagement protrusions; and the moveable plate starts moving along with the cartridge in response to the detector detecting the cartridge.

* * * * *